(12) United States Patent
Toyama et al.

(10) Patent No.: US 9,429,695 B2
(45) Date of Patent: Aug. 30, 2016

(54) POLARIZING PLATE WITH A PRESSURE-SENSITIVE ADHESIVE LAYER AND IMAGE DISPLAY DEVICE

(75) Inventors: Yuusuke Toyama, Osaka (JP); Tomoyuki Kimura, Osaka (JP); Atsushi Yasui, Osaka (JP); Masayuki Satake, Osaka (JP); Shusaku Goto, Osaka (JP); Takeharu Kitagawa, Osaka (JP); Minoru Miyatake, Osaka (JP); Tomohiro Mori, Osaka (JP); Takashi Kamijo, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 94 days.

(21) Appl. No.: 14/122,587

(22) PCT Filed: May 24, 2012

(86) PCT No.: PCT/JP2012/063305
§ 371 (c)(1),
(2), (4) Date: Nov. 26, 2013

(87) PCT Pub. No.: WO2012/161251
PCT Pub. Date: Nov. 29, 2012

(65) Prior Publication Data
US 2014/0111858 A1    Apr. 24, 2014

(30) Foreign Application Priority Data
May 26, 2011 (JP) ................. 2011-117588

(51) Int. Cl.
*G02B 5/30*  (2006.01)
*C08J 5/18*  (2006.01)
*G02F 1/1335*  (2006.01)

(52) U.S. Cl.
CPC ............. *G02B 5/305* (2013.01); *C08J 5/18* (2013.01); *G02B 5/3033* (2013.01); *G02F 1/133528* (2013.01)

(58) Field of Classification Search
CPC ........ G02B 5/305; G02B 5/3033; C08J 5/18; G02F 1/133528; G02F 2201/50; G02F 2202/28; C08L 33/066; C09J 7/0296; C09J 133/04; C09J 133/064; C09J 133/066; C09J 2203/318; C09J 2429/006; C09J 2433/00
USPC ....................................... 345/483.01–484.01
See application file for complete search history.

(56) References Cited

U.S. PATENT DOCUMENTS

2005/0197450 A1* 9/2005 Amano et al. ............... 525/30
2006/0024494 A1* 2/2006 Amano et al. ............... 428/343
(Continued)

FOREIGN PATENT DOCUMENTS

| CN | 101144868 A | 3/2008 |
| CN | 102033355 A | 4/2011 |

(Continued)

OTHER PUBLICATIONS

Japanese Office Action for JP2014-012656 dated Dec. 3, 2014.
(Continued)

*Primary Examiner* — Frank Font
(74) *Attorney, Agent, or Firm* — Hauptman Ham, LLP

(57) ABSTRACT

Provided is a polarizing plate with a pressure-sensitive adhesive layer which is excellent in reliability of optical properties and durability of pressure-sensitive adhesion. The polarizing plate with a pressure-sensitive adhesive layer comprises a polarizing film and a pressure-sensitive adhesive layer provided directly on at least one surface of the polarizing film. The pressure-sensitive adhesive layer comprises a pressure-sensitive adhesive composition containing a pressure-sensitive adhesive polymer, and an amount of an acid component in a total monomer component constituting the pressure-sensitive adhesive polymer is less than 8 wt %.

12 Claims, 1 Drawing Sheet

(56) References Cited

U.S. PATENT DOCUMENTS

| | | | |
|---|---|---|---|
| 2006/0045990 A1* | 3/2006 | Kim et al. | 428/1.1 |
| 2008/0085417 A1 | 4/2008 | Takeko et al. | |
| 2009/0163626 A1* | 6/2009 | Ukei et al. | 524/99 |
| 2011/0315306 A1 | 12/2011 | Goto et al. | |
| 2012/0327512 A1 | 12/2012 | Goto et al. | |
| 2013/0160938 A1 | 6/2013 | Yasui et al. | |

FOREIGN PATENT DOCUMENTS

| | | |
|---|---|---|
| JP | S60-169803 A | 9/1985 |
| JP | 2001-343521 | 12/2001 |
| JP | 2001-350021 A | 12/2001 |
| JP | 2003-279748 A | 10/2003 |
| JP | 2008-95081 | 4/2008 |
| JP | 2009-093074 A | 4/2009 |
| JP | 2009-251177 | 10/2009 |
| JP | 2010-44211 | 2/2010 |
| JP | 2011-100095 | 5/2011 |
| JP | 4691205 B | 6/2011 |
| JP | 5011444 | 8/2012 |
| TW | 200951510 A | 12/2009 |
| WO | 2009/069799 | 6/2009 |
| WO | 2010/044218 A1 | 4/2010 |
| WO | 2010/100917 | 9/2010 |

OTHER PUBLICATIONS

International Search Report for PCT/JP2012/063305 dated Jun. 26, 2012.

Chinese Office Action for application No. 201280037163.6 dated May 6, 2015.

* cited by examiner

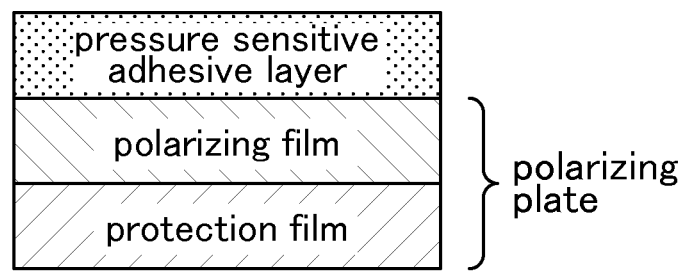

POLARIZING PLATE WITH A PRESSURE-SENSITIVE ADHESIVE LAYER AND IMAGE DISPLAY DEVICE

CROSS REFERENCE TO RELATED APPLICATION

This application claims the priority of Japanese Patent Application No. 2011-117588, filed on May 26, 2011 in the Japanese Patent and Trademark Office. Further, this application is the National Phase application of International Application No. PCT/JP2012/063305 filed on May 24, 2012, which is incorporated herein by reference in its entirety.

TECHNICAL FIELD

The present invention relates to a polarizing plate with a pressure-sensitive adhesive layer and an image display device. In particular, the present invention relates to a polarizing plate with a pressure-sensitive adhesive layer and an image display device which are excellent in reliability of optical properties, such as polarization degree, and durability of pressure-sensitive adhesion.

BACKGROUND ART

In an image display device such as a liquid crystal display device, an image forming system thereof essentially requires arranging a polarizing plate on each side of a glass substrate forming a surface of a liquid crystal panel. Typically, as the polarizing plate, a laminate is used which is obtained by laminating a transparent, polarizing plate protection film using triacetylcellulose or the like, to one or each of opposite surfaces of a polarizing film comprising a polyvinyl alcohol-based film and a dichroic material such as iodine, through a polyvinyl alcohol-based adhesive.

Generally, in an operation of attaching the polarizing film to a liquid crystal cell or the like, a pressure-sensitive adhesive is used. Further, in many cases, the pressure-sensitive adhesive is preliminarily provided on one surface of the polarizing film as a pressure-sensitive adhesive layer, because it has an advantage, for example, of being able to instantly fix the polarizing film to a liquid crystal cell or the like, and eliminate a need for a drying step to fix the polarizing film to a liquid crystal cell or the like. That is, in the polarizing plate attaching operation, it is common to use a polarizing plate with a pressure-sensitive adhesive layer.

Properties required for the pressure-sensitive adhesive layer include high durability free from aging deterioration of pressure-sensitive adhesion, and a capability of allowing the polarizing film to be peeled and re-laminated with respect to a surface of a liquid crystal panel even in cased where, during an operation of laminating the polarizing film to a liquid crystal cell, an error in lamination position occurs, or a foreign substance gets between laminated surfaces (re-workability).

Meanwhile, recent years, in an image display device for mobile applications such as a mobile phone, the entire module tends to be reduced in thickness and weight, particularly, in view of aesthetic design and portability. Thus, regarding an optical film such as a polarizing plate for use in an image display device, further thickness reduction and weight reduction are desired. Further, a usage environment such as usage in an outdoor harsh environment is becoming more diversified, and there is also a growing need for higher durability than ever before. In such a situation, there is a need for a polarizing film having a reduced thickness and excellent optical properties As technical means for responding to the request for thickness reduction, there has been proposed a technique of providing a pressure-sensitive adhesive directly on a polarizing film, while omitting a protection film which has heretofore been given to the polarizing film.

For example, JP 2010-44211A (Patent Document 1) relates to an invention intended to provide a polarizing plate comprising a polarizing film having excellent durability even in high-temperature environments, and a pressure-sensitive adhesive layer provided on one of opposite surfaces of the polarizing film, and discloses a polarizing plate which comprises: a polarizing film; a pressure-sensitive adhesive layer provided on one surface of the polarizing film; wherein a pressure-sensitive adhesive constituting the pressure-sensitive adhesive layer has a storage elastic modulus (G') at 23° C. of 0.2 to 10 MPa, and the pressure-sensitive adhesive layer has a thickness of 2 μm to less than 25 μm; and a protection layer composed of a transparent resin film and provided on the other surface of the polarizing film.

JP 2009-251177A (Patent Document 2) relates to an invention intended to provide a pressure-sensitive adhesion type polarizing plate comprising a polarizing film, a transparent protection film on only one surface of the polarizing film, and a pressure-sensitive adhesive layer on the surface of the polarizing film, wherein it is capable of satisfying a pressure-sensitive adhesion property as a pressure-sensitive adhesion type polarizing plate, and facilitating reworking without occurrence of break, and discloses a pressure-sensitive adhesion type polarizing plate which comprises a polarizing film, a transparent protection film provided on only one surface of the polarizing film through an adhesive layer, and a curable pressure-sensitive adhesive layer provided on the other surface of the polarizing film.

LIST OF PRIOR ART DOCUMENTS

Patent Documents

Patent Document 1: JP 2010-044211A
Patent Document 2: JP 2009-251177A

SUMMARY OF THE INVENTION

Technical Problem

In the course of advancing a technical development for thickness reduction of a polarizing film based on omission of a transparent protection film, the inventors of this application found that, due to a direct contact between a pressure-sensitive adhesive layer and a polarizing film, a new problem occurs, i.e., deterioration in performance of the polarizing film, such as optical properties, becomes prominent. It was also found that this problem becomes more prominent when the polarizing film itself is reduced in thickness.

It was further found that, along with the progress of the thickness reduction, a problem of deterioration in reworkability occurs. For details, it was found that a reduction in thickness of the polarizing film itself leads to a reduction in overall thickness of an optical film, thereby causing disadvantages, such as: deterioration in operation efficiency, e.g., the occurrence of difficulty in picking up with operator's fingers an edge of the polarizing plate during reworking; and an increase in possibility of brake of the polarizing film during reworking.

Although the above conventional techniques are designed while taking into account durability of pressure-sensitive adhesion and reworking, they are not designed while taking into account problems in a polarizing plate with a pressure-sensitive adhesive layer comprising a polarizing film and a pressure-sensitive adhesive layer provided directly on the polarizing film, i.e., an optical influence of a pressure-sensitive adhesive on the polarizing film, and a negative influence occurring when the polarizing plate itself is reduced in thickness. Moreover, the problems are not disclosed therein.

It is an object of the present invention to obtain a polarizing plate with a pressure-sensitive adhesive layer comprising a polarizing film and a pressure-sensitive adhesive layer provided directly on the polarizing film, while achieving excellence in reliability of optical properties, durability of pressure-sensitive adhesion, and reworkability.

Solution to the Technical Problem

With a focus on, particularly in the case where a pressure-sensitive adhesive layer is provided on one surface of a polarizing film, an influence of an acid component in a monomer component of a pressure-sensitive adhesive polymer contained in a pressure-sensitive adhesive composition constituting the pressure-sensitive adhesive layer, on performance of the polarizing film, the inventors have accomplished the present invention. In the conventional techniques, regarding a pressure-sensitive adhesive polymer contained in a pressure-sensitive adhesive composition constituting the pressure-sensitive adhesive layer, no consideration in terms of an association between an acid component in a monomer component and the performance of the polarizing film is made. The inventors has set an amount of acid component in a total monomer component of the pressure-sensitive adhesive polymer, which is required for obtaining a polarizing film with a pressure-sensitive adhesive layer, particularly, a thinned polarizing film, having excellent properties.

More specifically, a polarizing film with a pressure-sensitive adhesive layer of the present invention comprises a polarizing film and a pressure-sensitive adhesive layer provided directly on at least one surface of the polarizing film, wherein the pressure-sensitive adhesive layer comprises a pressure-sensitive adhesive composition containing a pressure-sensitive adhesive polymer, and wherein an amount of an acid component in a total monomer component constituting the pressure-sensitive adhesive polymer is less than 8 wt %.

In the present invention, the wording "a pressure-sensitive adhesive layer is provided "directly" on a surface of a polarizing film" means not only a state in which no layer is interposed between the polarizing film and the pressure-sensitive adhesive layer, but also a state in which there is another layer, such as an anchor layer, between the polarizing film and the pressure-sensitive adhesive layer.

In one embodiment of the present invention, the polarizing film has a thickness of 10 μm or less.

In a preferred embodiment of the present invention, the thickness of the polarizing film may be equal to or less than 7 μm.

In another embodiment of the present invention, the amount of the acid component is in the range of 0 to 6 wt %.

In a preferred embodiment of the present invention, the pressure-sensitive adhesive polymer does not substantially contain an acid component.

In the above polarizing plate with a pressure-sensitive adhesive layer, the pressure-sensitive adhesive layer may be provided on only one surface of the polarizing film.

In a preferred embodiment of the present invention, the pressure-sensitive adhesive layer may have a thickness of 1 to 35 μm.

In yet another embodiment of the present invention, the pressure-sensitive adhesive polymer is an acryl-based polymer or a methacryl-based polymer.

In still another embodiment of the present invention, the acid component is one selected from the group consisting of a carboxyl group-containing monomer, a phosphate group-containing monomer, and a sulfonate group-containing monomer.

The present invention also provides an image display device using the above polarizing plate with a pressure-sensitive adhesive layer in a number of at least one.

BRIEF DESCRIPTION OF THE DRAWINGS

FIG. 1 is a cross-sectional view of a polarizing plate with a pressure-sensitive adhesive layer according to some embodiments of the current description.

BEST MODE FOR CARRYING OUT THE INVENTION

Pressure-Sensitive Adhesive Composition

A pressure-sensitive adhesive composition will be described.

<Pressure-Sensitive Adhesive Polymer>

A pressure-sensitive adhesive polymer is not particularly limited, as long as it is a polymer having pressure-sensitive adhesion, commonly used as a base polymer for pressure-sensitive adhesives. However, because of easiness in achieving a balance of pressure-sensitive adhesion performance, a polymer having Tg of 0° C. or less (typically, −100° C. or more) is preferable. Among such pressure-sensitive adhesive polymers, for example, a polyester based polymer and a (meth)acryl-based polymer is preferably used.

As the polyester based polymer, saturated polyester or copolyester obtained from polyalcohol and polycarboxylic acid is typically used.

For example, the polyalcohol includes diols, such as ethylene glycol, propylene glycol, hexaethylene glycol, neopentyl glycol, 1,2-cyclohexandimethanol, 1,4-cyclohexandimethanol, decamethylene glycol, 1,3-propanediol, 1,4-butanediol, 1,5-pentanediol, 1,6-hexanediol, 2,2-bis(4-hydroxyphenyl)propane, and bis(4-(2-hydroxyethoxy))sulfone.

For example, the polycarboxylic acid includes: aromatic dicarboxylic acids, such as terephthalic acid, isophthalic acid, orthophthalic acid, 2,5-naphthalenedicarboxylic acid, 2,6-naphthalenedicarboxylic acid, 1,4-naphthalenedicarboxylic acid, 1,5-naphthalenedicarboxylic acid, diphenylcarboxylic acid, diphenoxyethanedicarboxylic acid, diphenyl sulfone carboxylic acid, and anthracenedicarboxylic acid; alicyclic dicarboxylic acids, such as 1,3-cyclopentanedicarboxylic acid, 1,3-cyclohexanedicarboxylic acid, 1,4-cyclohexanedicarboxylic acid, hexahydroterephthalic acid, and hexahydroisophthalic acid; and aliphatic dicarboxylic acids, such as malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimelic acid, azelaic acid, dimer acid, sebacic acid, suberic acid, and dodecadicarboxylic acid. As the polycarboxylic acid, two types of polycarboxylic acids, such as an aromatic dicarboxylic acid and an aliphatic dicarboxylic acid, are often used in combination.

An amount of an acid component consisting of these acids, in the total monomer component constituting the pressure-sensitive adhesive polymer, is less than 8 wt %, preferably, in the range of 0 to 6 wt %, more preferably, in the range of 0 to 2 wt %. Most preferably, the pressure-sensitive adhesive polymer does not substantially contain an acid component. As used herein, the wording "does not substantially contain" means "does not actively mix, except inevitable inmixing", more specifically, means "contains in an amount of less than 0.05 wt %, preferably, less than 0.01 wt %, more preferably, less than 0.001 wt %, on the basis of an amount of the total monomer component.

Regarding each of the polyalcohol and polycarboxylic acid for use in the polyester based polymer, while various types may be used without any particular limitation, polymer polyol such as polycarbonate diol may be used as the polyalcohol. The polyester based polymer can be obtained from the diol component, trihydric or higher polyalcohol and/or trihydric or higher polycarboxylic acid. As the polyester based polymer, a type having a weight-average molecular weight of 1.1000 or more is typically used.

Typically, the (meth)acryl-based polymer contains, as a primary component, alkyl(meth)acrylate serving as a monomer unit. As used herein, the term "(meth)acrylate" means acrylate and/or methacrylate.

As the alkyl(meth)acrylate making up a main backbone of the (meth)acrylic-based polymer, it is possible to exemplify a monomer comprising a straight-chain or branched-chain alkyl group having a carbon number of 1 to 18. For example, as the alkyl group, it is possible to exemplify methyl group, ethyl group, propyl group, isopropyl group, butyl group, isobutyl group, amyl group, hexyl group, cyclohexyl group, heptyl group, 2-ethylhexyl group, isooctyl group, nonyl group, decyl group, isodecyl group, dodecyl group, isomyristyl group, lauryl group, tridecyl group, pentadecyl group, hexadecyl group, heptadecyl group, and octadecyl group. These may be used independently or in combination. Preferably, an average carbon number of the alkyl group is in the range of 3 to 9.

It is also possible to use aromatic ring-containing alkyl (meth)acrylate, such as phenoxyethyl(meth)acrylate or benzil(meth)acrylate. The aromatic ring-containing alkyl(meth) acrylate may be used in such a manner that it is polymerized and a resulting polymer is mixed with the exemplified (meth)acryl-based polymer. However, preferably, in view of transparency, the aromatic ring-containing alkyl(meth)acrylate is used in such a manner as to be copolymerized with the exemplified (meth)acryl-based polymer.

With a view to improving adhesiveness and heat resistance, at least one type of copolymerizable monomer comprising a polymerizable functional group having an unsaturated double bond, such as a (meth)acryloyl group or a vinyl group, may be introduced into the exemplified (meth)acryl-based polymer by means of copolymerization. Specific examples of the copolymerizable monomer include: hydroxy group-containing monomer, such as 2-hydroxyethyl(meth)acrylate, 3-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, or (4-hydroxymethyl-cyclohexyl)-methylacrylate; carboxyl group-containing monomer, such as (meth)acrylic acid, carboxyethyl(meth) acrylate, carboxypentyl(meth)acrylate, itaconic acid, maleic acid, fumaric acid, or crotonic acid; acid anhydride group-containing monomer, such as maleic acid anhydride or and itaconic acid anhydride; acrylic acid-caprolactone adduct; sulfonate group-containing monomer, such as styrenesulfonic acid, allyl sulfonic acid, 2-(meth)acrylamide-2-methylpropanesulfonic acid, (meth)acrylamidopropanesulfonic acid, sulfopropyl(meth)acrylate, or (meth)acryloyloxy naphthalenesulfonic acid; and phosphate group-containing monomer, such as 2-hydroxyethyl acryloyloxy phosphate.

Among the above copolymerizable monomers, the acid component in the present invention includes a copolymerizable monomer which comprises a polymerizable functional group having an unsaturated double bond, such as a (meth)acryloyl group or a vinyl group. Specific examples of the copolymerizable monomer as the acid component include: carboxyl group-containing monomer, such as acrylic acid, (meth)acrylic acid, carboxyethyl(meth)acrylate, carboxypentyl(meth)acrylate, itaconic acid, maleic acid, fumaric acid, or crotonic acid; acrylic acid-caprolactone adduct; acid anhydride group-containing monomer, such as maleic acid anhydride or itaconic acid anhydride; acrylic acid-caprolactone adduct; sulfonate group-containing monomer, such as styrenesulfonic acid, allyl sulfonic acid, 2-(meth)acrylamide-2-methylpropanesulfonic acid, (meth)acrylamidopropanesulfonic acid, sulfopropyl(meth) acrylate, or (meth)acryloyloxy naphthalenesulfonic acid; and phosphate group-containing monomer, such as 2-hydroxyethyl acryloyloxy phosphate.

When the acid component exists, in view of a negative influence of an acid, a relatively weak acid, such as a carboxyl group-containing monomer would be most desirable, and a second-best monomer may be a phosphate group-containing monomer or a sulfonate group-containing monomer.

An amount of the acid component in the total monomer component constituting the pressure-sensitive adhesive polymer is less than 8 wt %, preferably, in the range of 0 to 6 wt %, more preferably, in the range of 0 to 4 wt %, and it is most preferable that the pressure-sensitive adhesive polymer does not substantially contain an acid component. As used herein, the wording "does not substantially contain" means "does not actively mix, except inevitable in mixing", more specifically, means "contains in an amount of less than 0.05 wt %, preferably, less than 0.01 wt %, more preferably, less than 0.001 wt %, on the basis of an amount of the total monomer component.

Examples of a monomer usable for the purpose of property modification include: (N-substituted) amine-based monomer, such as (meth)acrylamide, N,N-dimethyl(meth) acrylamide, N-butyl(meth)acrylamide, N-methylol(meth) acrylamide, or N-methylolpropane(meth)acrylamide; alkylaminoalkyl(meth)acrylate monomer, such as aminoethyl (meth)acrylate, N,N-dimethylaminoethyl(meth)acrylate, or t-butylaminoethyl(meth)acrylate; alkoxyalkyl(meth)acrylate-based monomer, such as methoxyethyl(meth)acrylate, or ethoxyethyl(meth)acrylate; succinimide-based monomer, such as N-(meth)acryloyloxymethylenesuccinimide, N-(meth)acryloyl-6-oxyhexamethylenesuccinimide, N-(meth)acryloyl-8-oxyoctamethylenesuccinimide or N-acryloylmorpholine; maleimide-based monomer, such as N-cyclohexyl maleimide, N-isopropylmaleimide, N-lauryl maleimide, or N-phenyl maleimide; itaconimide-based monomer, such as N-methyl itaconimide, N-ethyl itaconimide, N-butyl itaconimide, N-octyl itaconimide, N-2-ethylhexyl itaconimide, N-cyclohexyl itaconimide, or N-lauryl itaconimide.

As the modifying monomer, it is also possible to use: a vinyl-based monomer, such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinyl-carboxylic acid amides, styrene, α-methylstyrene or N-vinylcaprolactam; a cyanoacrylate-based monomer, such as acrylonitrile and methacrylonitrile; an epoxy group-containing acrylic monomer, such as glycidyl(meth)acrylate; a glycol-based acryl ester monomer, such as polyethylene glycol(meth)acrylate, polypropylene glycol(meth)acrylate, methoxyethylene glycol (meth)acrylate, or methoxy polypropylene glycol(meth) acrylate; an acrylic acid ester-based monomer, such as tetrahydrofurfuryl(meth)acrylate, fluorine(meth)acrylate, silicone(meth)acrylate or 2-methoxyethyl acrylate. Further, the modifying monomer includes isoprene, butadiene, isobutylene and vinyl ether.

Other examples of the copolymerizable monomer include a silane-based monomer containing a silicon atom. Examples of the silane-based monomer include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

As the copolymerizable monomer, it is also possible to use: a polyfunctional monomer having two or more unsaturated double bonds of a (meth)acryloyl group, a vinyl group or the like, such as an esterified substance of (meth)acrylic acid and polyalcohol, wherein the polyfunctional monomer includes (meth)acrylate esters of polyhydric alcohols, tripropylene glycol di(meth)acrylate, tetraethylene glycol di(meth)acrylate, 1,6-hexanediol di(meth)acrylate, bisphenol A diglycidyl ether di(meth)acrylate, neopentyl glycol di(meth) acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, and caprolactone-modified dipentaerythritol hexa(meth)acrylate; and polyester(meth)acrylate, epoxy (meth)acrylate and urethane(meth)acrylate obtained by adding, as the same functional group as that in the monomer component, two or more unsaturated double bonds of a (meth)acryloyl group, a vinyl group or the like, respectively, to polyester, epoxy and urethane as a backbone.

Among the above copolymerizable monomers, the hydroxyl group-containing monomer and the carboxyl group-containing monomer are preferably used in view of adhesiveness and durability. The hydroxyl group-containing monomer and the carboxyl group-containing monomer may be used in combination. In the case where the pressure-sensitive adhesive composition contains a crosslinking agent, the copolymerizable monomer serves as a reactive site with the crosslinking agent. The hydroxyl group-containing monomer and the carboxyl group-containing monomer are sufficiently reactive with an intermolecular crosslinking agent, so that they are preferably used to improve cohesion property and heat resistance of a resulting pressure-sensitive adhesive layer. The hydroxyl group-containing monomer is preferable in terms of reworkability. On the other hand, the carboxyl group-containing monomer is preferable in view of satisfying both durability and reworkability.

The hydroxyl group-containing monomer is used in an amount of about 0.01 to 30 wt %, preferably, about 0.03 to 20 wt %, more preferably, 0.05 to 10 wt %.

Besides the above, one or more copolymerizable monomers other than the acid component are used in an amount of about 0 to 30 wt %, preferably, about 0.1 to 20 wt %, more preferably, 0.1 to 10 wt %.

For production of the (meth)acryl-based polymer, one of conventional production methods such as solution polymerization, bulk polymerization, emulsion polymerization and various radical polymerizations may be appropriately selected. The resulting (meth)acryl-based polymer may be any type of copolymer such as a random copolymer, a block copolymer or a graft copolymer.

In the solution polymerization, for example, ethyl acetate or toluene is used as a polymerization solvent. As a specific example of the solution polymerization, a reaction is induced by adding a polymerization initiator in a stream of inert gas such as nitrogen, and, typically, under reaction conditions including a reaction temperature of about 50 to about 70° C. and a reaction time of about 5 to about 30 hours.

An additive for use in the radical polymerization, such as a polymerization initiator, a chain transfer agent or an emulsifier, is not particularly limited, but may be appropriately selected and used. A weight-average molecular weight of the (meth)acryl-based polymer may be controlled by the reaction conditions and/or an amount of the polymerization initiator and/or the chain transfer agent to be used, and the amount may be appropriately adjusted for each of the additives.

Examples of the polymerization initiator include, but are not limited to, azo-based initiators, such as 2,2'-azobisisobutylonitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); peroxide-based initiators, such as: persulfates including potassium persulfate and ammonium persulfate; di(2-ethylhexyl)peroxydicarbonate, di(4-t-butylcyclohexyl)peroxydicarbonate, di-sec-butylperoxydicarbonate, t-butylperoxyneodecanoate, t-hexylperoxypivalate, t-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, t-butylperoxyisobutylate, 1,1-di(t-hexylperoxy)cyclohexane, t-butylhydroperoxide, and hydrogen peroxide; and redox-based initiators, such as a combination of peroxide and reducing agent, including a combination of persulfate and sodium hydrogen sulfite, and a combination of peroxide and sodium ascorbate.

The above polymerization initiators may be used independently, or in the form of a mixture of two or more thereof. A total content thereof is preferably in the range of about 0.005 to 1 wt parts, more preferably, about 0.02 to 0.5 wt parts, with respect to 100 wt parts of the monomer(s).

For example, in the case where the (meth)acryl-based polymer having the above weight-average molecular weight is produced using 2,2'-azobisisobutyronitrile as the polymerization initiator, an amount of the polymerization initiator to be used is preferably set in the range of about 0.06 to 0.2 wt parts, more preferably about 0.08 to 0.175 wt parts, with respect to 100 wt parts, i.e., a total amount of the monomer component.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. While the chain transfer agents may be used independently, or in the form of a mixture of two or more thereof, a total content of the chain transfer agent is preferably equal to or less than 0.1 wt parts, with respect to 100 parts, i.e., the total amount of the monomer component.

Examples of the emulsifier for use in the emulsion polymerization include: an anionic surfactant, such as sodium laurylsulfate, ammonium laurylsulfate, sodium dodecylbenzenesulfonate, polyoxyethylene alkyl ether ammonium sulfate, and sodium polyoxyethylene alkyl phenyl ether sulfate; and a nonionic surfactant, such as polyoxyethylene alkyl ether, polyoxyethylene alkyl phenyl ether, polyoxyethylene fatty acid ester, and polyoxyethylene-polyoxypropylene blockpolymer. These emulsifiers may be used independently, or in the form of a mixture of two or more thereof.

Further, as specific examples of a reactive emulsifier, i.e., an emulsifier into which a radical-polymerizable functional group such as a propenyl group or an allyl ether group, there are Aqualon HS-10, HS-20, KH-10, BC-05, BC-10 and BC-20 (all of which are manufactured by Dai-Ichi Kogyo Seiyaku Co., Ltd.), and Adeka Reasoap SE10N (manufactured by ADEKA Corporation). It is preferable to use the reactive emulsifier, because it is incorporated in a polymer chain after polymerization, so that water resistance becomes better. With respect to 100 wt parts, i.e., the total amount of the monomer component, an amount of the emulsifier to be used is in the range of 0.3 to 5 wt parts, more preferably, 0.5 to 1 wt part, in view of polymerization stability or mechanical stability.

Generally, as the pressure-sensitive adhesive polymer usable in the present invention, a type having a weight-average molecular weight of 300,000 to 4,000,000 is used. Considering durability, particularly, heat resistance, it is more preferably to use a type having a weight-average molecular weight of 500,000 to 3,000,000. A weight average molecular weight less than 300,000 is unfavorable in terms of heat resistance. On the other hand, a weight average molecular weight of greater than 4,000,000 is unfavorable in terms of laminatability and adhesive force. As used herein, the term "weight-average molecular weight" means a value obtained by subjecting a measurement value from GPC (gel permeation chromatography), to a polystyrene conversion.
<Other Components in Pressure-Sensitive Adhesive Composition>

The pressure-sensitive adhesive composition for use in the present invention may contain a crosslinking agent. It is possible to use as the crosslinking agent an organic crosslinking agent or a polyfunctional metal chelate. Examples of the organic crosslinking agent include an isocyanate crosslinking agent, a peroxide-based crosslinking agent, an epoxy-based crosslinking agent, and an imine-based crosslinking agent. The polyfunctional metal chelate has a structure in which a polyvalent metal is covalently or coordinately bonded to an organic compound. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. For example, an atom for forming a covalent or coordinate bond in the organic compound may be an oxygen atom. Examples of the organic compound include alkyl esters, alcohol compounds, carboxylic acid compounds, ether compounds, and ketone compounds.

As the crosslinking agent, it is preferable to use an isocyanate-based crosslinking agent and/or a peroxide-based crosslinking agent. Examples of a compound for the isocyanate-based crosslinking agent include: isocyanate monomer, such as tolylene diisocyanate, chlorophenylene diisocyanate, tetramethylene diisocyanate, xylylene diisocyanate, diphenylmethane diisocyanate, or hydrogenated diphenylmethane diisocyanate; isocyanate compound, isocyanurate compound or burette type compound obtained by adding the isocyanate monomer to trimethylolpropane or the like; and urethane prepolymer type isocyanate obtained by an addition reaction of polyether polyol, polyester polyol, acrylic polyol, polybutadiene polyol, polyisoprene polyol or the like. It is particularly preferable to use a polyisocyanate compound such as one selected from the group consisting of hexamethylene diisocyanate, hydrogenated xylylene diisocyanate, and isophorone diisocyanate, or a derivative thereof. Examples of one selected from the group consisting of hexamethylene diisocyanate, hydrogenated xylylene diisocyanate, and isophorone diisocyanate, or a derivative thereof include hexamethylene diisocyanate, hydrogenated xylylene diisocyanate, isophorone diisocyanate, polyol-modified hexamethylene diisocyanate, polyol-modified hydrogenated xylylene diisocyanate, trimer-type hydrogenated xylylene diisocyanate, and polyol-modified isophorone diisocyanate. The exemplified polyisocyanate compounds are desirable, because a reaction with a hydroxyl group quickly progresses using an acid or base contained in the polymer, like a catalyst, which particularly contributes to quickness of crosslinking.

Any type of peroxide-based crosslinking agent may be appropriately used as long as it is capable of generating radical active species by heating or light irradiation and promoting crosslinking of the base polymer of the pressure-sensitive adhesive composition. In view of operational efficiency (workability) and stability, a peroxide to be used is preferably a type having a one-minute half-life temperature of 80° C. to 160° C., more preferably a type having a one-minute half-life temperature of 90° C. to 140° C.

Examples of the peroxide usable as the crosslinking agent include di(2-ethylhexyl)peroxydicarbonate (one-minute half-life temperature: 90.6° C.), di(4-t-butylcyclohexyl)peroxydicarbonate (one-minute half-life temperature: 92.1° C.), di-sec-butyl peroxydicarbonate (one-minute half-life temperature: 92.4° C.), t-butyl peroxyneodecanoate (one-minute half-life temperature: 103.5° C.), t-hexyl peroxypivalate (one-minute half-life temperature: 109.1° C.), t-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl)peroxide (one-minute half-life temperature: 128.2° C.), dibenzoyl peroxide (one-minute half-life temperature: 130.0° C.), t-butyl peroxyisobutylate (one-minute half-life temperature: 136.1° C.), and 1,1-di(tert-hexylperoxy)cyclohexane (one-minute half-life temperature: 149.2° C.). Among them, di(4-t-butylcyclohexyl) peroxydicarbonate (one-minute half-life temperature: 92.1° C.), dilauroyl peroxide (one-minute half-life temperature: 116.4° C.) and dibenzoyl peroxide (one-minute half-life temperature: 130.0° C.) are particularly excellent in efficiency of crosslinking reaction.

The half-life of a peroxide is an index representing a decomposition rate of the peroxide, and means a period of time before a remaining amount of the peroxide reaches one-half. A decomposition temperature for obtaining the half-life at an arbitrary time and a half-life time under an arbitrary temperature are described in a manufacturer's catalog or the like, for example, "Organic Peroxide Catalog, 9th edition (May, 2003)", NOF Corporation.

An amount of the crosslinking agent to be used is preferably in the range 0.01 to 20 wt parts, more preferably, 0.03 to 10 wt parts, with respect to 100 wt parts of the pressure-sensitive adhesive polymer. If the amount of the crosslinking agent is less than 0.01 wt parts, a cohesion force of the pressure-sensitive adhesive tends to become insufficient, and foaming is likely to occur during heating. If the amount is greater than 20 wt parts, humidity resistance becomes insufficient, so that peeling is more likely to occur in a reliability test or the like.

The above isocyanate crosslinking agents may be used singly, or in the form of a mixture of two or more thereof. With respect to 100 wt parts of the pressure-sensitive adhesive polymer, the polyisocyanate compound crosslinking agent(s) is contained preferably in a total amount of 0.01 to 2 wt parts, more preferably, in a total amount of 0.02 to 2 wt parts, further preferably, in a total amount of 0.05 to 1.5 wt parts. It may be appropriately contained while taking into account the cohesion force, anti-peeling in a durability test, etc.

The above peroxides may be used singly, or in the form of a mixture of two or more thereof. With respect to 100 wt parts of the pressure-sensitive adhesive polymer, the peroxide(s) is contained preferably in a total amount of 0.01 to 2 wt parts, more preferably in a total amount of 0.04 to 1.5 wt parts, further preferably in a total amount of 0.05 to 1 wt parts. The content may be appropriately selected within this range to adjust processability, reworkability, crosslinking stability, peelability, etc.

As for a measurement technique for a decomposition amount of the peroxide remaining after a reaction treatment, it may be measured using HPLC (high performance liquid chromatography).

More specifically, for example, after a reaction treatment, the pressure-sensitive adhesive composition is collected by about 0.2 g, and subjected to shaking extraction at 25° C. and at 120 rpm for 3 hours in a shaking apparatus, while being immersed in 10 ml of ethyl acetate. Then, a resulting extract is statically placed at room temperatures for 3 days. Then, 10 ml of acetonitrile is added thereto, and a resulting mixture is shaken at 25° C. and at 120 rpm for 30 minutes. About 10 µL of an extracted solution obtained by filtration through a membrane filter (0.45 µm) is poured in and analyzed by HPLC. In this way, an amount of the peroxide(s) after the reaction treatment can be obtained.

It is particularly preferable to mix a silane coupling agent as an additive. Examples of the silane coupling agent include: epoxy-structured silicon compounds, such as 3-glycidoxypropyltrimethoxysilane, 3-glycidoxypropylmethyldiethoxysilane, and 2-(3,4-epoxycyclohexyl)ethyltrimethoxysilane; amino group-containing silicon compounds, such as 3-aminopropyltrimethoxysilane, N-(2-aminoethyl)-3-aminopropyltrimethoxysilane, and N-(2-aminoethyl)-3-aminopropylmethyldimethoxysilane; 3-chloropropyltrimethoxysilane; (meth)acrylic group-containing silane coupling agents, such as acetoacetyl group-containing trimethoxysilane, 3-acryloxypropyltrimethoxysilane, and 3-methacryloxypropyltriethoxysilane; and isocyanate group-containing silane coupling agents, such as 3-isocyanatepropyltriethoxysilane. Particularly, it is preferable to use 3-glycidoxypropyltrimethoxysilane, and acetoacetyl group-containing trimethoxysilane, in view of a capability of effectively suppressing peeling. The silane coupling agent can provide durability, particularly, an effect of suppressing peeling in a humidified environment. An amount of the silane coupling agent to be used is equal to or less than 1 wt part, more specifically, in the range of 0.01 to 1 wt parts, preferably in the range of 0.02 to 0.6 wt parts, with respect to 100 wt parts of the pressure-sensitive adhesive polymer. If the amount of the silane coupling agent is excessively increased, an adhesive force to a liquid crystal cell excessively increases, which is likely to exert an influence on reworkability.

The pressure-sensitive adhesive composition for use in the invention may further contain any other conventional additive. For example, depending on intended purposes, it is possible to appropriately add, to the pressure-sensitive adhesive composition: a powder, such as a colorant or a pigment, a dye, a surfactant, a plasticizer, an adhesion-imparting agent, a surface lubricant, a leveling agent, a softening agent, an antioxidant, an anti-aging agent, a light stabilizer, an ultraviolet absorbing agent, a polymerization inhibitor, an inorganic or organic filler, a metal powder, or a particle or foil-shaped material. A reducing agent may be added to employ a redox system in a controllable range.

The above pressure-sensitive adhesive composition is used to form a pressure-sensitive adhesive layer. In advance of the formation of the pressure-sensitive adhesive layer, it is desirable to adjust a total amount of the crosslinking agent to be added, and sufficiently consider influences of a crosslinking treatment temperature and a crosslinking treatment time.

The crosslinking treatment temperature and the treatment crosslinking time may be adjusted depending on a type of crosslinking agent to be used. Preferably, the crosslinking treatment temperature is set to 170° C. or less.

The crosslinking treatment may be performed under a temperature during a drying step for the pressure-sensitive adhesive layer, or may be performed after the drying step by providing a crosslinking treatment step separately.

Regarding the crosslinking treatment time, it may be set while taking into account productivity and operational efficiency, typically, in the range of about 0.2 to 20 minutes, preferably, in the range of about 0.5 to 10 minutes.

[Pressure-Sensitive Adhesive Layer]

The pressure-sensitive adhesive layer will be described.

A polarizing film with a pressure-sensitive adhesive of the present invention comprises a polarizing film and a pressure-sensitive adhesive layer made of the pressure-sensitive adhesive composition and formed on at least one surface of the polarizing film.

Examples of a method of forming the pressure-sensitive adhesive layer include a method comprising the steps of: applying the pressure-sensitive adhesive composition to a release-treated separator or the like; removing a polymerization solvent and others by drying, to form the pressure-sensitive adhesive layer; and transferring the pressure-sensitive adhesive layer onto an optical film, and a method comprising the steps of: applying the pressure-sensitive adhesive composition to an optical film; removing a polymerization solvent and others by drying, to form the pressure-sensitive adhesive layer on the optical member. In the step of applying the pressure-sensitive adhesive, one or more types of solvents other than the polymerization solvent may be newly added, as required.

As the release-treated separator, it is preferable to use a silicone releasable liner. As a technique of drying the pressure-sensitive adhesive in the step of, after applying the pressure-sensitive adhesive composition to the liner, drying it to form the pressure-sensitive adhesive layer, any suitable technique may be appropriately employed, depending on intended purposes. Preferably, a technique of heating and drying the applied film is employed. The heating and drying temperature is preferably in the range of 40° C. to 200° C., more preferably in the range of 50° C. to 180° C., particularly preferably in the range of 70° C. to 170° C. When the heating temperature is set in the above range, the pressure-sensitive adhesive layer can be obtained with an excellent pressure-adhesive adhesion property.

A period of time of the drying may be appropriately determined to be a suitable time. The drying time is preferably in the range of 5 seconds to 20 minutes, more preferably in the range of 5 seconds to 10 minutes, particularly preferably in the range of 10 seconds to 5 minutes.

The pressure-sensitive adhesive layer may be formed after subjecting a surface of the polarizing film to formation of an anchor layer or to any of various easy-adhesion treatments, such as a corona treatment and a plasma treatment. A surface of the pressure-sensitive adhesive layer may be subjected to an easy-adhesion treatment.

Regarding an anchor layer and an adhesive layer to be formed during a process of providing the pressure-sensitive adhesive layer to a surface of a polarizing film, it is desirable to use it in an acid-free state.

Examples of a specific method of forming an anchor layer include a method comprising the steps of: adjusting a solution containing an urethane-based polymer (e.g., Denatron B510-C manufactured by Nagase ChemteX Corporation) to have a solid content of 0.2 wt %, using a water-isopropyl alcohol (volume ratio: 65:35) mixed solution; applying an adjusted solution to a polarizing film using a #5 Meyer bar; and drying the applied solution at 50° C. for 30 seconds to form a 25 nm-thick anchor coat layer.

As a technique of forming the pressure-sensitive adhesive layer, various techniques may be employed. Specific examples of the technique include roll coating, kiss roll coating, gravure coating, reverse coating, roll brush coating, spray coating, dip roll coating, bar coating, knife coating, air knife coating, curtain coating, lip coating, and extrusion coating process using a die coater.

A thickness of the pressure-sensitive adhesive layer may be, but is not particularly limited to, in the range of 1 to 100 µm, preferably, 1 to 50 µm, more preferably, 1 to 40 µm, further preferably, 1 to 35 µm.

When the thickness of the pressure-sensitive adhesive layer is reduced, a total amount of acid in the pressure-sensitive adhesive layer with respect to the polarizing film is reduced, so that it becomes possible to reduce an influence on optical properties, such as a polarization degree of a polarizing plate with a pressure-sensitive adhesive layer.

Moreover, generally, along with a reduction in thickness of the pressure-sensitive adhesive layer, a pressure-sensitive adhesion force will be lowered, and durability of pressure-sensitive adhesion, such as durability against lifting or peeling, tends to be deteriorated, due to a contraction stress of the polarizing plate caused by a contraction of the polarizing film. Thus, it is unfavorable to reduce the thickness of the pressure-sensitive adhesive layer. However, the contraction stress of the polarizing plate can be reduced by reducing s thickness of the polarizing film, so that the durability of pressure-sensitive adhesion can be maintained or improved even if the thickness of the pressure-sensitive adhesive layer is reduced.

In cases where the pressure-sensitive adhesive layer is exposed outside, the pressure-sensitive adhesive layer may be protected by a release-treated sheet (separator) until it is actually used.

Examples of a material for the separator include: plastic films, such as a polyethylene film, a polypropylene film, a polyethylene terephthalate film, and a polyester film; porous materials, such as paper, woven fabric, and nonwoven fabric; and an appropriate thin sheet-shaped material, such as a net, a foamed sheet, a metal foil, and a laminate thereof. In view of superiority in surface smoothness, it is preferable to use the plastic film.

The plastic film is not particularly limited, as long as it is capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is typically in the range of about 5 to 200 µm, preferably, in the range of about 5 to 100 µm. According to need, the separator may be subjected to: a release and anti-fouling treatment using a silicone-based, fluoride-based, long-chain alkyl-based or fatty acid amide-based release agent, a silica powder or the like; or an anti-static treatment by coating, mixing by kneading, vapor-deposition, or the like. In particular, releasability or peelability of the separator with respect to the pressure-sensitive adhesive layer can be further enhanced by appropriately subjecting the surface of the separator to a release treatment, such as a silicone treatment, a long-chain alkyl treatment, or a fluorine treatment.

The release-treated sheet used during preparation of the polarizing plate with a pressure-sensitive adhesive layer is directly usable as a separator for the polarizing plate with a pressure-sensitive adhesive layer. This makes it possible to simplify a production process.

[Polarizing Film]

The polarizing film will be described.

The polarizing film is not particularly limited, but various types may be used. Examples of the polarizing film include: a film obtained by causing a dichroic material, such as iodine or a dichroic dye, to be adsorbed onto a hydrophilic polymer film, such as a polyvinyl alcohol-based film, a partially-formalized polyvinyl alcohol-based film, or a ethylene-vinyl acetate copolymer-based partially-saponified film, and uniaxially stretching the dyed film; or a polyene-based oriented film of a dehydration product of polyvinyl alcohol or a dehydrochlorination product of polyvinyl chloride. Among them, a polarizing film comprising a polyvinyl alcohol-based film and a dichroic material such as iodine is preferable. While a thickness of the polarizing film is not particularly limited, a preferable thickness of the polarizing film will be described in detail later.

The iodine-dyed and uniaxially-stretched, polyvinyl alcohol-based polarizing film may be prepared, for example, by dyeing a polyvinyl alcohol film through immersion in an aqueous iodine solution, and stretching the dyed film to 3 to 7 times of its original length. According to need, the immersion may be performed using an aqueous solution e.g., an aqueous potassium iodide solution, which may contain boric acid, zinc sulfate and/or zinc chloride. Further, before the dyeing, the polyvinyl alcohol-based film may be water-washed through immersion in water, if necessary. When the polyvinyl alcohol-based film is subjected to water-washing, it becomes possible to wash away contamination and an anti-blocking agent on a surface of the polyvinyl alcohol-based film, and cause the polyvinyl alcohol-based film to swell, thereby preventing unevenness in dyeing, etc. The stretching may be performed after the dyeing using iodine, or during the dyeing using iodine, or before the dyeing using iodine. The stretching may be performed in an aqueous solution of boric acid, potassium iodide or the like, or in a water bath.

The polarizing plate with a pressure-sensitive adhesive layer may be provided with a transparent protection film on a surface of the polarizing film on a side where the pressure-sensitive adhesive layer is not provided.

As a material for forming the transparent protection film, a thermoplastic resin is used which is excellent in transparency, mechanical strength, thermal stability, water blocking property, isotropy, etc. Specific examples of the thermoplastic resin include cellulose resin such as triacetylcellulose, polyester resin, polyethersulfone resin, polysulfone resin, polycarbonate resin, polyamide resin, polyimide resin, polyolefin resin, (meth)acrylic resin, cyclic polyolefin resin (norbornene resin), polyarylate resin, polystyrene resin, polyvinyl alcohol resin, and mixtures thereof.

Examples of a transparent protection film usable herein include: polymer films disclosed in JP 2001-343529A (WO 01/37007), such as (A) a thermoplastic resin having a substituted and/or un-substituted imide group in a side chain, and (B) a thermoplastic resin having a substituted and/or un-substituted phenyl and nitrile groups in a side chain. Specific examples thereof include a film of a resin composition containing an alternating copolymer of isobutylene and N-methylmaleimide, and an acrylonitrile-styrene copolymer. The resin composition may be used in the form of a film prepared, for example, as a mixed and extruded produced. Such a film has a small retardation and a small photoelastic coefficient, so that it can prevent a defect of the polarizing plate, such as unevenness due to strain. In addition, the film is low in moisture permeability and thus excellent in humidification durability.

While a thickness of the transparent protection film may be appropriately determined, it is typically in the range of about 1 to about 500 μm, in view of strength, operational efficiency such as handleability, layer-thinning performance, etc. Specifically, the thickness of the transparent protection film is preferably in the range of 1 to 300 μm, more preferably, in the range of 5 to 200 μm, particularly preferable, in the range of 5 to 150 μm.

As the transparent protection film, it is preferable to use at least one selected from the group consisting of cellulose resin, polycarbonate resin, cyclic polyolefin resin, and (meth)acrylic resin.

The cellulose resin is an ester of cellulose and fatty acid. Specific examples of such a cellulose ester-based resin include triacetylcellulose, diacetyl cellulose, tripropionyl cellulose, and dipropionyl cellulose. Among them, triacetyl-cellulose is particularly preferred. Triacetylcellulose is advantageous in view of easy of procurement and cost, because many related products are commercially available. Examples of the commercially available product of triacetylcellulose include: "UV-50", "UV-80", "SH-80", "TD-80U", "TD-TAC", and "UZ-TAC" (trade names) manufactured by Fujifilm Corporation; and "KC series" manufactured by KONICA MINOLTA, Inc. Generally, in these products of triacetylcellulose, while an in-plane retardation (Re) is almost zero, a thickness-directional retardation (Rth) is about 60 nm or less.

Such a cellulose resin film having a relatively small thickness-directional retardation can be obtained, for example, by treating the above cellulose resin. Examples of a specific production method include a method that includes a method comprising the steps of: preparing a substrate film made of a polyethylene terephthalate, polypropylene, stainless steel or the like and coated with a solvent such as cyclopentanone or methyl ethyl ketone; laminating the substrate film to a conventional cellulose-based film; drying a resulting laminate by heating (e.g., at 80 to 150° C. for about 3 to 10 minutes); and then peeling off the substrate film, and a method comprising the steps of: applying, onto a conventional cellulose resin film, a solution obtained by dissolving a norbornene resin, a (meth)acryl-based resin or the like in a solvent such as cyclopentanone or methyl ethyl ketone; drying by heating the cellulose resin film with the solution (e.g., at 80 to 150° C. for about 3 to 10 minutes); and then peeling off a resulting coating film.

As the cellulose resin film having a relatively small thickness-directional retardation, it is possible to use a fatty acid cellulose-based resin film having a controlled degree of fat substitution. While commonly used triacetylcellulose has a degree of acetic acid substitution of about 2.8, this degree of acetic acid substitution can be controlled to fall within the range of 1.8 to 2.7, so as to reduce the Rth. Further, a plasticizer, such as dibutyl phthalate, p-toluenesulfonanilide or acetyl triethyl citrate, may be added to the fatty acid-substituted cellulose-based resin so as to control the Rth at a lower level. An amount of the plasticizer to be added is preferably equal to or less than 40 wt parts, more preferably, in the range of 1 to 20 wt parts, further preferably in the range of 1 to 15 wt parts, with respect to 100 wt parts of the fatty acid cellulose-based resin.

A specific example of the cyclic polyolefin resin is preferably a norbornene-based resin. The cyclic olefin resin is a generic name for resins obtained by polymerizing cyclic olefin as a polymerization unit, and examples thereof include resins described in JP 01-240517A, JP 03-14882A, and JP 03-122137A. Specific examples thereof include: a cyclic olefin ring-opened (co)polymer; a cyclic olefin addition polymer; a copolymer (typically, random copolymer) of cyclic olefin and α-olefin such as ethylene or propylene; a graft polymer obtained by modifying each of these polymers with an unsaturated carboxylic acid or a derivative thereof; and hydrides thereof. Specific examples of the cyclic olefin include a norbornene-based monomer.

Regarding the cyclic polyolefin resin, various products are commercially available. Specific examples thereof include "ZEONEX" and "ZEONOR" (trade name) manufactured by ZEON Corporation, "ARTON" (trade name) manufactured by JSR Corporation, "TOPAS" (trade name) manufactured by Ticona L.L.C., and "APEL" (trade name) manufactured by Mitsui Chemicals, Inc.

Examples of the (meth)acryl-based resin include a type having Tg (glass transition temperature), preferably, of 115° C. or more, more preferably, of 120° C. or more, further preferably 125° C. or more, particularly preferably 130° C. or more. The Tg of 115° C. or more makes it possible for the polarizing plate to ensure excellent durability. While an upper limit to the Tg of the (meth)acryl-based resin is not particularly limited, it is preferably set to 170° C. or less, in view of formability, etc. The (meth)acryl-based resin makes it possible to obtain a film in which both of the in-plane retardation (Re) and the thickness-directional retardation (Rth) thereof are almost zero.

As the (meth)acryl-based resin, any suitable type may be employed to an extent that effects of the present invention are not impaired. Examples of the (meth)acryl-based resin include: poly(meth)acrylate, such as polymethylmethacrylate; methyl methacrylate-(meth)acrylic acid copolymer; methyl methacrylate-(meth)acrylic ester copolymer; methyl methacrylate-acrylic ester-(meth)acrylic acid copolymer; methyl(meth)acrylate-styrene copolymer (such as MS resin); and alicyclic hydrocarbon group-containing polymer (such as methyl methacrylate-cyclohexyl methacrylate copolymer or methyl methacrylate-norbornyl(meth)acrylate copolymer). Preferably, the examples also include poly(C1 to C6 alkyl(meth)acrylate), such as polymethyl(meth)acrylate). More preferably, the examples further include a methyl methacrylate-based resin consisting mainly of methyl methacrylate (in an amount of 50 to 100 wt %, preferably, 70 to 100 wt %).

Specific examples of the (meth)acryl-based resin include ACRYPET VH and ACRYPET VRL20A each manufactured by MITSUBISHI RAYON Co., Ltd., and a type described in JP 2004-70296A which comprises a (meth)acryl-based resin having an intramolecular ring structure and a high-Tg (meth) acryl-based resin obtained by an intramolecular crosslinking or intramolecular cyclization reaction.

As the (meth)acryl-based resin, a lactone ring structure-containing (meth)acryl-based resin may also be employed. This is because it has high heat resistance and high transparency and also has high mechanical strength after undergoing biaxial stretching.

Examples of the lactone ring structure-containing (meth) acryl-based resin include lactone ring structure-containing (meth)acrylic reins described in JP 2000-230016A, JP 2001-151814A, JP 2002-120326A, JP 2002-254544A, and JP 2005-146084A.

Preferably, the lactone ring structure-containing (meth) acrylic rein has a quasi-ring structure expressed as the following general formula (formula 6):

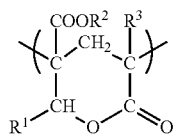

In the formula, $R^1$, $R^2$ and $R^3$ each independently represent a hydrogen atom or an organic residue having a carbon atom number of 1 to 20. The organic residue may contain an oxygen atom.

The lactone ring structure expressed as the general formula (formula 6) is contained in the lactone ring structure-containing (meth)acryl-based resin preferably in an amount of 5 to 90 wt %, more preferably, in an amount of 10 to 70 wt %, further preferably, in an amount of 10 to 60 wt %, particularly preferably, in an amount of 10 to 50 wt %. If the content of the lactone ring structure expressed as the general formula (formula 6) in the lactone ring structure-containing (meth)acryl-based resin is less than 5 wt %, heat resistance, solvent resistance, and surface hardness become insufficient. If the content of the lactone ring structure expressed as the general formula (formula 6) in the lactone ring structure-containing (meth)acryl-based resin is greater than 90 wt %, formability and processability are likely to become poor.

A mass average molecular weight (also referred to as "weight-average molecular weight") of the lactone ring structure-containing (meth)acryl-based resin is preferably in the range of 1,000 to 2,000,000, more preferably, in the range of 5,000 to 1,000,000, further preferably, in the range of 10,000 to 500,000, particularly preferably, in the range of 50,000 to 500,000. A mass average molecular weight deviating from the above range is unfavorable in terms of formability and processability.

Tg of the lactone ring structure-containing (meth)acryl-based resin is preferably equal to or greater than 115° C., more preferably, equal to or greater than 120° C., further preferably, equal to or greater than 125° C., particularly preferably, equal to or greater than 130° C. That is, the Tg is equal to or greater than of 115° C. Thus, for example, when this resin is incorporated into the polarizing plate in the form of the transparent protection film, it provides excellent durability. While an upper limit to the Tg of the lactone ring structure-containing (meth)acryl-based resin is not particularly limited, it is preferably set to 170° C. or less, in view of formability, etc.

The lactone ring structure-containing (meth)acryl-based resin is evaluated to be better as a total light transmittance thereof measured by the method according to ASTM-D-1003 becomes higher. Specifically, the total light transmittance is preferably equal to or greater than 85% or more, more preferably, equal to or greater than 88%, further preferably, equal to or greater than of 90%. The total light transmittance is an indicator of transparency. When the total light transmittance is less than 85%, the transparency is likely to be deteriorated.

In order to improve adhesiveness (bondability) with respect to the polarizing film, before being coated with an adhesive, the transparent protection film may be subjected to a surface modification treatment. Specific examples of the treatment include a corona treatment, a plasma treatment, a flame treatment, an ozone treatment, a primer treatment, a glow treatment, a saponification treatment, and a treatment using a coupling agent. An anti-static layer may also be formed, as required.

A surface of the transparent protection film on a side where the polarizing film is not bonded may be subjected to coating of a hard coating layer, an anti-reflection treatment, or a treatment for anti-sticking, diffusion or anti-glare.

The surface-treated film may also be used in such a manner as to be laminated to a front plate. Examples of the surface-treated film include a hard-coated film for use in imparting resistance against scratch to the surface, an anti-glare treated film for preventing glare on an image display device, and an anti-reflection film, such as an anti-reflective film or a low-reflective film. The front plate is provided in such a manner as to be laminated on a surface of the image display device, such as a liquid crystal display device, an organic EL display device, a CRT, or a PDP, in order to protect the image display device or to provide a high-grade appearance or to differentiate itself based on aesthetic design. The front plate is also used as a support for a patterned retardation layer (e.g., patterned ¼λ retardation film) having a function of converting an image for a left eye and an image of a right eye to respective different polarization states, in a 3D-TV. For example, in a liquid crystal display device, the front plate is provided on an upper side of the polarizing plate on a viewing side. As long as the pressure-sensitive adhesive layer in the present invention is employed, even when a plastic substrate, such as a polycarbonate substrate or a polymethyl methacrylate substrate, is used as the front plate, instead of a glass substrate, the same effect as that of the glass substrate can be brought out.

An optical film comprising the polarizing plate and an optical layer laminated on the polarizing plate may be formed in such a manner as to laminate them sequentially or separately during a production process of a liquid crystal display device or the like. However, an optical film prepared by preliminarily laminating them is excellent in quality stability and assemblability, and advantageous in improving a production process of a liquid crystal display device or the like. The lamination is performed by using appropriate bonding means. For bonding between the polarizing plate and any other optical layer, their optical axes may be set at an appropriate arrangement angle, depending on an intended retardation property, etc.

The optical plate with a pressure-sensitive adhesive layer of the present invention is preferably used to form various image display devices, such as liquid crystal display device. The formation of a liquid crystal display device may be performed according to a conventional technique. Specifically, a liquid crystal display device is typically formed by appropriately assembling a display panel such as a liquid crystal cell, a pressure-sensitive adhesion-type optical film, and an optional component such as a lighting system, and incorporating a driving circuit into a resulting assembly. In the present invention, such a conventional technique can be employed without any particular restriction, except for the use of the optical plate with a pressure-sensitive adhesive layer of the present invention. Regarding a liquid crystal cell, it is possible to use any type, such as TN type, STN type, π type, VA type, or IPS type.

It is possible to form an appropriate liquid crystal display device, such as a liquid crystal display device in which the pressure-sensitive adhesion-type optical film is disposed on one or each of opposite side of a display panel such as a liquid crystal cell, or a liquid crystal display device in which a backlight or a reflector is used in a lighting system. In this case, the polarizing plate with a pressure-sensitive adhesive layer of the present invention may be disposed on one or each of the opposite sides of the display panel. When the two optical films are provided on the respective opposite sides, they may be the same type or may be different types. In the liquid crystal display device forming process, an appropriate component, such as a diffusion plate, an anti-glare layer, an anti-reflection film, a protective plate, a prism array, a lens array sheet, a light diffusion plate, or a backlight may be arranged at an appropriate position and in the form of one or more layers.

Next, an organic electroluminescence device (organic EL display device: OLED) will be described. Generally, in an organic EL display device, a transparent electrode, an organic light-emitting layer and a metal electrode are laminated on a transparent substrate in this order to form a light-emitting element (organic electroluminescence light-emitting element). In this structure, the organic light-emitting layer is a laminate of various organic thin films, wherein there have been known various combination structures, such as: a laminate of a hole injection layer made of a triphenylamine derivative or the like and a light-emitting layer made of a fluorescent organic solid material such as anthracene; a laminate of the light-emitting layer and an electron injection layer made of a perylene derivative or the like; and a laminate of the hole injection layer, the light-emitting layer, and the electron injection layer.

The organic EL display device is operable to emit light based on the following principle. Upon applying a voltage between the transparent electrode and the metal electrode, holes and electrons are injected into the organic light-emitting layer, and energy produced by recombination of the holes and the electrons excites the fluorescent substance, and, when the excited fluorescent substance goes back to the ground state, light is emitted. The mechanism of the recombination during the process is similar to that in a commonly-used diode. As expected from this, a current and an emission intensity exhibit strong nonlinearity causing rectification with respect to an applied voltage.

In the organic EL display device, at least one of the electrodes must be transparent in order to extract emission from the organic light-emitting layer, so that a transparent electrode made of a transparent electrical conductor such as an indium tin oxide (ITO) is typically used as an anode. On the other hand, in order to facilitate the electron injection and increase light-emitting efficiency, it is important to use a low-work-function substance for an cathode, and an electrode of a metal such as Mg—Ag or Al—Li is typically used.

In the organic EL display device configured as above, the organic light-emitting layer is formed of a very thin film having a thickness of about 10 nm Thus, as with the transparent electrode, the organic light-emitting layer allows light to be approximately fully transmitted therethrough. Light entering from a front surface of the transparent substrate during a non-light-emitting state is transmitted through the transparent electrode and the organic light-emitting layer, and reflected by the metal electrode to exit from the front surface of the transparent substrate, so that a display surface of the organic EL display device looks like a mirror surface when viewed from the outside.

In an organic EL display device having an organic electroluminescence light-emitting element which comprises: an organic light-emitting layer capable of emitting light according to voltage application thereto; a transparent electrode provided on the side of a front surface of the organic light-emitting layer; and a metal electrode provided on the side of a back surface of the organic light-emitting layer, a polarizing plate may be provided on the side of the front surface of the transparent electrode, and a retardation plate may be provided between the transparent electrode and the polarizing plate.

The retardation plate and the polarizing plate have a function of polarizing light entered from the outside and reflected by the metal electrode, so that the polarization function is effective in preventing a mirror surface of the metal electrode from becoming visible from the outside. Particularly, when the retardation plate is composed of a ¼λ plate, and an angle defined between polarization directions of the polarizing plate and the retardation plate is adjusted to be π/4, the mirror surface of the metal electrode can be completely shielded.

That is, in external light incident on the organic EL display device, only a linearly-polarized light component is transmitted through the polarizing plate. The linearly-polarized light is generally converted into elliptically-polarized light by the retardation plate. Particularly when the retardation plate is composed of a ¼λ plate and the angle defined between polarization directions of the polarizing plate and the retardation plate is π/4, the linearly-polarized light is converted into circularly-polarized light.

The circularly-polarized light is transmitted through the transparent substrate, the transparent electrode, and the organic thin film, and, after being reflected by the metal electrode and transmitted through the organic thin film, the transparent electrode and the transparent substrate again, converted into linearly-polarized light again through the retardation plate. The linearly-polarized light has a polarization direction orthogonal to that of the polarizing plate and thus cannot pass through the polarizing plate. As a result, the mirror surface of the metal electrode can be completely shielded.

As above, with a view to blocking mirror reflection, in the organic EL display device, an elliptically or circularly-polarizing plate having a combination of a retardation plate and a polarizing plate may be used with the organic EL panel through the pressure-sensitive adhesive layer. Alternatively, instead of directly laminating the elliptically or circularly-polarizing plate to the organic EL panel, a laminate formed by laminating the elliptically or circularly-polarizing plate to a touch panel through the pressure-sensitive adhesive layer may be used with the organic EL panel.

As a touch panel usable with the present invention, it is possible to use various types, such as an optical type, an ultrasonic type, a capacitance type, and a resistive type. The resistive touch panel is configured such that a touch-side, touch panel electrode plate having a transparent conductive thin film and a display-side, touch panel electrode plate having a transparent conductive thin film are disposed in opposed relation to each other via a spacer to allow the transparent conductive thin films to be located opposed to each other. On the other hand, a capacitance touch panel is typically configured such that a transparent conductive film having a transparent conductive thin film with a given pattern shape is formed over the entire surface of a display thereof. The pressure-sensitive adhesion-type optical film of the present invention may be applied to any of the touch side and the display side.

[Thinning of Polarizing Film]

As mentioned above, as one polarizing film (i.e., polarizer) production method for a polyvinyl alcohol-based resin (PVA-based resin) layer on which a dichroic material is adsorbed and molecularly oriented through dyeing and stretching, there has been known a production method using a thermoplastic resin substrate.

For example, an aqueous solution of a PVA-based resin is applied onto a thermoplastic resin substrate, and dried to remove water therefrom to prepare a laminate of the thermoplastic resin substrate and a thin PVA-based resin layer formed on the thermoplastic resin substrate. The prepared laminate is subjected to in-air stretching at a stretching temperature of 110° C., using a stretching device installed, for example, in an oven. Then, the PVA-based resin layer molecularly oriented through the stretching is subjected to dyeing to allow a dichroic material to be adsorbed thereon. Then, the laminate having the dichroic material adsorbed thereon is subjected to in-air stretching at a stretching temperature of 90° C. In this way, a polarizing film comprising a PVA-based resin and having a molecularly oriented dichroic material can be produced.

As compared to a polarizing film production method based on only a single layer of PVA-based resin, the polarizing film production method using the thermoplastic resin substrate is capable of uniformly producing a thinned polarizing film. As disclosed in JP 2005-266325A, in the polarizing film production method based on only the single layer, a polarizing film used in a liquid crystal display device in such a manner as to be laminated on each of front and back sides of a liquid crystal cell is produced by: loading a 50 to 80 μm-thick single layer of PVA-based resin, on a conveyance device, for example, having a plurality of roll sets each having a different circumferential velocity; immersing the single layer of PVA-based resin in a dyeing solution to adsorb a dichroic material thereon; and stretching the dyed layer in an aqueous solution at about 60° C. This is a polarizing plate produced using the single layer, and a thickness thereof is in the range of 15 to 35 μm. The polarizing plate produced by this method has been practically used in a large-screen TV as a type having optical properties including a single transmittance of 42% or more and a polarization degree of 99.95%.

However, due to hydrophilic properties of the PVA-based resin, the polarizing film is sensitive to changes in temperature and humidity, and likely to undergo expansion and contraction along with a change in surrounding environment, so that crack is highly likely to occur. Thus, in order to suppress expansion and contraction and reduce an influence of temperature and humidity, a laminate of a polarizing film and two 40 to 80 μm-thick TAC (triacetyl cellulose-based) films laminated on respective opposite surfaces of the polarizing film is typically used as a polarizing film for a TV to serve as a protective film. Even so, in the case where the polarizing film produced using the single layer is employed, this type of polarizing film has a limitation in reduction in thickness, and thereby it is difficult to fully suppress expansion and contraction. Thus, when an optical film laminate comprising this type of polarizing film is laminated to a member, such as another optical film or a liquid crystal cell, through an adhesive layer or a pressure-sensitive adhesive layer, a stress caused by expansion and contraction occurs in the member. This stress poses a factor causing display unevenness in a liquid crystal display device. This display unevenness is caused by occurrence of photoelasticity and deformation in the member due to a contraction stress of the polarizing film. Thus, in order to reduce the occurrence of display unevenness, a member to be used will be limited, for example, to a low-photoelasticity and low-birefringence material. The contraction stress of the polarizing film also causes peeling of the optical film laminate from the liquid crystal cell, etc., so that a pressure-sensitive adhesive having a high adhesive force is required. However, the pressure-sensitive adhesive having a high adhesive force has a problem with reworkability, etc.

In regard to a thickness of a polarizing film, although it is expected that even a conventional polarizing film having a thickness of about 30 μm or less brings out a sufficient effect in terms of optical properties, the present invention would bring out an excellent effect when a polarizing film in has a relatively small thickness of about 20 μm or less. Particularly, in a thinned polarizing plate having a thickness of 10 μm or less, particularly, a thickness of 1 to 7 μm or less, the present invention brings out a remarkable effect of achieving high optical properties while reducing the contraction stress causing a durability problem.

[Production Method for Thinned Polarizing Film]

A thinned polarizing film production method will be described.

Typical examples of a thinned polarizing film production method include a production method comprising: a step of stretching a laminate of a PVA-based resin layer and a stretching resin substrate: and a dyeing step, as described in JP 51-069644A, JP 2000-338329A, WO 2010/100917A, and JP 2010-197413. This method makes it possible to stretch a PVA-based resin layer without problems such as break due to stretching, even if the PVA-based resin layer has a small thickness because it is supported by the stretching resin substrate.

Among methods comprising the step of stretching a laminate and the dyeing step, in view of a capability of performing stretching at high ratio to enhance polarization performance, it is preferable to employ a method comprising a step of performing stretching in an aqueous boric acid solution, as described in WO 2010/100917A, JP 2010-263692 and JP 2010-269002, and it is particularly preferable to employ a method comprising a step of performing auxiliary in-air stretching before stretching in an aqueous boric acid solution, as described in JP 2010-263692 and JP 2010-269002.

Specifically, in the case where such a thinned polarizing film is used as a polarizing film for use in the polarizing plate with a pressure-sensitive adhesive layer, it is preferable to use a thinned polarizing film produced by a thinned polarizing film production method which comprises the steps of: subjecting a polyvinyl alcohol-based resin layer formed on a non-crystallizable ester-based thermoplastic resin substrate in the form of a continuous web to elevated temperature in-air stretching, thereby forming a stretched intermediate product comprising an oriented polyvinyl alcohol-based resin layer; causing a dichroic material to be adsorbed onto the stretched intermediate product, thereby forming a colored intermediate product which comprises a polyvinyl alcohol-based resin layer having a molecularly-oriented dichroic material; and subjecting the colored intermediate product to in-boric-acid-solution stretching, thereby forming a polarizing film which comprises a polyvinyl alcohol-based resin layer having a molecularly-oriented dichroic material, and has a thickness of 10 µm or less.

In the above production method, a total stretch ratio of the polyvinyl alcohol-based resin layer formed on the non-crystallizable ester-based thermoplastic resin substrate and subjected to the elevated temperature in-air stretching and the in-boric-acid-solution stretching is preferably 5 times or more. A temperature of an aqueous boric acid solution for the in-boric-acid-solution stretching may be set to 60° C. or more. Before stretching the colored intermediate product in the aqueous boric acid solution, it is preferable to subject the colored intermediate product to an insolubilization treatment. In this case, it is preferable to immerse the colored intermediate product in an aqueous boric acid solution having a temperature of 40° C. or less. The non-crystallizable ester-based thermoplastic resin substrate may be made of non-crystallizable polyethylene terephthalate comprising: copolymerized polyethylene terephthalate copolymerized with isophthalic acid; copolymerized polyethylene terephthalate copolymerized with cyclohexanedimethanol; or any other copolymerized polyethylene terephthalate, wherein it is preferably made of a transparent resin. A thickness of the substrate may be 7 times a thickness of the polyvinyl alcohol-based resin layer to be formed thereon. A stretching ratio in the elevated temperature in-air stretching is preferably equal to or less than 3.5 times, and a stretching temperature of the elevated temperature in-air stretching is preferably equal to or greater than a glass transition temperature of the polyvinyl alcohol-based resin, specifically, in the range of 95° C. to 150° C. When the elevated temperature in-air stretching is performed through end-free uniaxial stretching, a total stretching ratio of the polyvinyl alcohol-based resin layer formed on the non-crystallizable ester-based thermoplastic resin substrate is preferably in the range of 5 to 7.5 times. On the other hand, when the elevated temperature in-air stretching is performed through fixed-end uniaxial stretching, a total stretching ratio of the polyvinyl alcohol-based resin layer formed on the non-crystallizable ester-based thermoplastic resin substrate is preferably in the range of 5 to 8.5 times.

More specifically, a thinned polarizing film can be produced by the following method.

A substrate in the form of a continuous web, which is made of isophthalic acid co-polymerized polyethylene terephthalate (non-crystallizable PET) copolymerized with 6 mol % of isophthalic acid, is prepared. The non-crystallizable PET has a glass transition temperature of 75° C. A laminate of a polyvinyl alcohol (PVA) layer and the non-crystallizable PET substrate in the form of a continuous web is prepared in the following manner. For comparison, PVA has a glass transition temperature of 80° C.

A 200 µm-thick non-crystallizable PET substrate, and an aqueous 4-5% PVA solution obtained by dissolving in water a PVA powder having a polymerization degree of 1,000 or more and a saponification degree of 99% or more are preliminarily prepared. Then, the aqueous PVA solution is applied to a 200 µm-thick non-crystallizable PET substrate and dried at a temperature of 50 to 60° C., thereby obtaining a laminate comprising the non-crystallizable PET substrate and a 7 µm-thick PVA layer formed on the non-crystallizable PET substrate.

The laminate comprising the 7 µm-thick PVA layer is subjected to a two-stage stretching process comprising preliminarily in-air stretching and in-boric-acid-solution stretching, thereby producing a 3 µm-thick, thinned highly-functional polarizing film. Through the first-stage preliminarily in-air stretching, the laminate comprising the 7 µm-thick PVA layer is stretched together with the non-crystallizable PET substrate to form a stretched laminate comprising a 5 µm-thick PVA layer. Specifically, this stretched laminate is obtained by: feeding the laminate comprising the 7 µm-thick PVA layer to a stretching apparatus installed within an oven set in a stretching temperature environment of 130° C.; and subjecting the laminate to end-free uniaxial stretching to attain a stretching ratio of 1.8 times. Through this stretching, the PVA layer comprised in the stretched laminate is changed into a 5 µm-thick PVA layer having oriented PVA molecules.

Then, through a dyeing step, a colored laminate which comprises a 5 µm-thick PVA layer having oriented PVA molecules and iodine absorbed thereon is formed. Specifically, this colored laminate is obtained by immersing the above stretched laminate in a dyeing liquid containing iodine and potassium iodide and having a temperature of 30° C., for a certain time which allows a single transmittance of a PVA layer constituting a finally-formed highly-functional polarizing layer to fall within the range of 40 to 44%, thereby causing iodine to be adsorbed onto the PVA layer comprised in the stretched laminate. In this step, the dyeing liquid is prepared using water as a solvent to allow an iodine concentration and a potassium iodide concentration to fall, respectively, within the range of 0.12 to 0.30 wt % and the range of 0.7 to 2.1 wt %. A concentration ratio of iodine to potassium iodide is 1:7. Incidentally, potassium iodide is required for allowing iodine to be dissolved in water. More specifically, the stretched laminate is immersed in a dyeing liquid containing 0.30 wt % of iodine and 2.1 wt % of potassium iodide, for 60 seconds, thereby forming a colored laminate comprising 5 µm-thick PVA layer having oriented PVA molecules and iodine absorbed thereon.

Then, through the second-stage in-boric-acid-solution stretching, the colored laminate is further stretched together with the non-crystallizable PET substrate to form an optical film laminate comprising a PVA layer making up a 3 µm-thick highly-functional polarizing film. Specifically, this optical film laminate is obtained by: feeding the above colored laminate to a stretching apparatus installed in a processing apparatus in which an aqueous boric acid solution containing boric acid and potassium iodide and having a temperature ranging from 60 to 85° C.: and subjecting the laminate to end-free uniaxial stretching to attain a stretching ratio of 3.3 times. More specifically, the aqueous boric acid solution has a temperature of 65° C. In the solution, a content of boric acid and a content of potassium iodide are set, respectively, to 4 wt parts and 5 wt parts, with respect to 100 wt parts of water. In this step, the colored laminate having a controlled amount of absorbed iodine is first immersed in the aqueous boric acid solution for 5 to 10 seconds. Subsequently, the colored laminate is directly fed between a plurality of roll sets each having a different circumferential velocity, which serve as a stretching device installed in the processing apparatus, and subjected to end-free uniaxial stretching for 30 to 90 seconds to attain a stretch ratio of 3.3 times. Through this stretching, the PVA layer comprised in the colored laminate is changed to a 3 μm-thick PVA layer in which the absorbed iodine is highly oriented in one direction, as a polyiodide ion complex. This PVA layer makes up a highly-functional polarizing layer in the optical film laminate.

Preferably, in a washing step, which is not essential for the production of the optical film laminate, the optical film laminate is taken out of the aqueous boric acid solution, and boric acid attached on a surface of the 3 μm-thick PVA layer formed on the non-crystallizable PET substrate is washed away by an aqueous potassium iodide solution. Subsequently, the washed optical film laminate is dried in a drying step using warm air at 60° C. It should be noted that the washing step is to prevent a defect in appearance, such as deposit of boric acid.

In lamination and/or transfer steps, which are also not essential for the production of the optical film laminate, an 80 μm-thick triacetylcellulose film is laminated to a surface of the 3 μm-thick PVA layer formed on the non-crystallizable PET substrate, while applying an adhesive to the surface, and then the non-crystallizable PET substrate is peeled off, so that the 3 μm-thick PVA layer can be transferred to the 80 μm-thick triacetylcellulose film.

[Additional Steps]

The above thinned polarizing film production method may comprise an additional step other than the above steps. Examples of the additional step include an insolubilization step, a crosslinking step, a drying step (adjustment of moisture percentage). The additional step may be performed at any appropriate timing.

The insolubilization step is typically performed by immersing the PVA-based resin layer in an aqueous boric acid solution. Through the insolubilization treatment, water resistance can be imparted to the PVA-based resin layer. A concentration of the aqueous boric acid solution is preferably in the range of 1 to 4 wt parts, with respect to 100 wt parts of water. An insolubilization bath (aqueous boric acid solution) preferably has a temperature of 20° C. to 50° C. Preferably, the insolubilization step is performed after the preparation of the laminate and before the dyeing step or the in-air stretching step.

The crosslinking step is typically performed by immersing the PVA-based resin layer in an aqueous boric acid solution. Through the crosslinking treatment, water resistance can be imparted to the PVA-based resin layer. A concentration of the aqueous boric acid solution is preferably in the range of 1 to 4 wt parts, with respect to 100 wt parts of water. When the crosslinking step is performed after the dyeing step, it is preferable to additionally mix iodide. The addition of iodide makes it possible to suppress elution of iodine absorbed on the PVA-based resin layer. An amount of iodide to be mixed is preferably in the range of 1 to 5 wt parts, with respect to 100 wt parts of water. Examples of iodide include those as mentioned above. A temperature of a crosslinking bath (aqueous boric acid solution) is preferably in the range of 20° C. to 50° C. Preferably, the crosslinking step is performed before the second-stage in-boric-acid-solution stretching step. In a preferred embodiment, the dyeing step, the crosslinking step and the second-stage in-boric-acid-solution stretching step are performed in this order.

Through the above production method, for example, a polarizing film in the form of a continuous web, which comprises a polyvinyl alcohol type resin having a molecularly-oriented dichroic material can be obtained, wherein the polarizing film is formed by subjecting a laminate comprising a polyvinyl alcohol-based resin layer formed on a crystallizable ester-based thermoplastic resin substrate, to a 2-stage stretching process comprising a preliminary in-air stretching and an in-boric-acid-solution stretching to have a thickness of 10 μm or less, and wherein the polarizing film has optical properties which satisfy conditions represented by the formulae: $P > -(10^{0.929T-42.4}-1) \times 100$ (where $T<42.3$); and $P \geq 99.9$ (where $T \geq 42.3$) where: T represents a single transmittance, and P represents a polarization degree.

The present invention will be described in more detail based on the following examples. It should be understood that the present invention is not limited to such examples.

EXAMPLES

Preparation of Pressure-Sensitive Adhesive Composition)

<Preparation of Pressure-Sensitive Adhesive Polymer>

99 parts of butyl acrylate, 1.0 part of 4-hydroxybutyl acrylate, and 2,2-azobisisobutyronitrile (in an amount of 0.3 parts with respect to 100 parts of monomers (solid content)) were put, together with ethyl acetate, into a reaction vessel equipped with a cooling tube, a nitrogen introducing tube, a thermometer and a stirrer, to induce a reaction in a nitrogen gas stream at 60° C. for 4 hours. then, ethyl acetate was added to a resulting reaction solution to obtain a solution containing an acryl-based pressure-sensitive adhesive polymer which includes no acid component in pressure-sensitive adhesive polymer-constituting monomers (solid content concentration: 30 wt %).

<Measurement of Weight-Average Molecular Weight>

A weight-average molecular weight of the resulting pressure-sensitive adhesive polymer was measured by GPC (gel permeation chromatography).

Analyzer: HLC-8120GPC manufactured by Tosoh Corporation
  Column: G7000H$_{XL}$+GMH$_{XL}$+GMH$_{XL}$ manufactured by Tosoh Corporation
  Column size: each 7.8 mmϕ×30 cm (90 cm in total)
  Column temperature: 40° C.
  Flow rate: 0.8 mL/minute
  Injection volume: 100 μl
  Eluent: tetrahydrofuran
  Detector: differential refractometer (RI).
  Standard sample: polystyrene A weight-average molecular weight of an acryl-based pressure-sensitive adhesive polymer contained in the resulting solution was 1,650,000.

<Preparation of Pressure-Sensitive Adhesive Composition>

With respect to 100 parts of the solid content in the acryl-based pressure-sensitive adhesive polymer solution, 0.3 parts of dibenzoyl peroxide (NYPER BMT manufactured by NOF CORPORATION), 0.1 parts of trimethylolpropane xylylene diisocyanate (Takenate D110N manufactured by Mitsui Takeda Chemicals, Inc.) and 0.2 parts of a silane coupling agent (A-100 manufactured by Soken Chemical & Engineering Co., Ltd., an acetoacetyl group-containing silane coupling agent) were mixed therein to obtain an acryl-based pressure-sensitive adhesive composition (pressure-sensitive adhesive A).

Next, according to the same process as mentioned above, except that an amount of butyl acrylate, an amount of 4-hydroxybutyl acrylate and an amount of acrylic acid were set, respectively, to 97 parts, 1.0 part and 2 parts, a solution containing an acryl-based pressure-sensitive adhesive polymer which includes an acid component in an amount of 2 wt % in a total pressure-sensitive adhesive polymer-constituting monomer component was obtained.

A weight-average molecular weight of an acryl-based pressure-sensitive adhesive polymer contained in the resulting solution was 1,800,000.

Based on the acryl-based pressure-sensitive adhesive polymer, an acryl-based pressure-sensitive adhesive composition (pressure-sensitive adhesive B) was obtained in the same manner as mentioned above.

Next, according to the same process as that for the pressure-sensitive adhesive A, except that an amount of butyl acrylate, an amount of 4-hydroxybutyl acrylate and an amount of acrylic acid were set, respectively, to 95.5 parts, 0.5 part and 4 parts, a solution containing an acryl-based pressure-sensitive adhesive polymer which includes an acid component in an amount of 4 wt % in a total pressure-sensitive adhesive polymer-constituting monomer component was obtained.

A weight-average molecular weight of an acryl-based pressure-sensitive adhesive polymer contained in the resulting solution was 1,700,000.

Based on the acryl-based pressure-sensitive adhesive polymer, an acryl-based pressure-sensitive adhesive composition (pressure-sensitive adhesive C) was obtained in the same manner as that in the pressure-sensitive adhesive A, except that 0.6 parts of trimethylolpropane tolylene diisocyanate (CORONATE L manufactured by Nippon Polyurethane Industry Co., Ltd.) was used in place of D110N.

Next, according to the same process as that for the pressure-sensitive adhesive A, except that an amount of butyl acrylate, an amount of 4-hydroxybutyl acrylate and an amount of acrylic acid were set, respectively, to 93.9 parts, 0.1 part and 6 parts, a solution containing an acryl-based pressure-sensitive adhesive polymer which includes an acid component in an amount of 6 wt % in a total pressure-sensitive adhesive polymer-constituting monomer component was obtained.

A weight-average molecular weight of an acryl-based pressure-sensitive adhesive polymer contained in the resulting solution was 1,950,000.

Based on the acryl-based pressure-sensitive adhesive polymer, an acryl-based pressure-sensitive adhesive composition (pressure-sensitive adhesive D) was obtained in the same manner as that in the pressure-sensitive adhesive C, except that a mixing amount of trimethylolpropane xylylene diisocyanate was set to 0.45 parts.

Next, according to the same process as that for the pressure-sensitive adhesive A, except that an amount of butyl acrylate, an amount of 4-hydroxybutyl acrylate and an amount of acrylic acid were set, respectively, to 89.9 parts, 0.1 part and 10 parts, a solution containing an acryl-based pressure-sensitive adhesive polymer which includes an acid component in an amount of 10 wt % in a total pressure-sensitive adhesive polymer-constituting monomer component was obtained.

A weight-average molecular weight of an acryl-based pressure-sensitive adhesive polymer contained in the resulting solution was 2,000,000.

Based on the acryl-based pressure-sensitive adhesive polymer, an acryl-based pressure-sensitive adhesive composition (pressure-sensitive adhesive E) was obtained in the same manner as that in the pressure-sensitive adhesive C, except that a mixing amount of trimethylolpropane xylylene diisocyanate was set to 0.4 parts.

(Preparation of Polarizing Plate)
<Preparation of Polarizing Plate 1>

An 80 μm-thick polyvinyl alcohol film was stretched between two roll sets each having a different velocity ratio to attain a stretching ratio of 3 times, while being dyed in a 0.3% iodine solution at 30° C. for 1 minute. Then, the film was stretched to attain a total stretching ratio of 6 times, while being immersed in an aqueous solution containing boric acid in a concentration of 4% and potassium iodide in a concentration of 10%, at 60° C. for 0.5 minutes. Subsequently, the film was cleaned in such a manner as to be immersed in an aqueous solution containing potassium iodide in a concentration of 1.5%, at 30° C. for 10 seconds, and then dried at 50° C. for 4 minutes to obtain a 25 μm-thick polarizing film. An 80 μm-thick saponified triacetylcellulose film was laminated to one surface of the polarizing film through a polyvinyl alcohol-based adhesive to prepare a polarizing plate 1.

<Preparation of Polarizing Plate 2>

In order to prepare a thinned polarizing film, a laminate comprising a non-crystallizable PET substrate and a 24 μm-thick PVA layer formed thereon was first subjected to preliminary in-air stretching at a stretching temperature of 130° C. to form a stretched laminate. Subsequently, the stretched laminate was subjected to dyeing to form a colored laminate, and the colored laminate was subjected to in-boric-acid-solution stretching together with the non-crystallizable PET substrate, at a stretching temperature of 65° C. to attain a total stretching ratio of 5.94 times, thereby forming an optical film laminate comprising a 10 μm-thick PVA layer. Through this two-stage stretching, an optical film laminate comprising a 10 μm-thick PVA layer making up a highly-functional polarizing film in which PVA molecules of the PVA layer formed on non-crystallizable PET substrate are highly oriented, and iodine adsorbed by the dyeing is highly oriented in one direction as a polyiodide ion complex.

Further, an 80 μm-thick saponified triacetylcellulose film was laminated to a surface of the polarizing film of the optical film laminate while applying a polyvinyl alcohol-based adhesive to the surface of the polarizing film, and then the non-crystallizable PET substrate was peeled off to prepare a polarizing plate 2.

<Preparation of Polarizing Plate 3>

A polarizing plate 3 was prepared according to the same production process as that for the above thinned polarizing plate, except the PVA layer of the laminate was formed to have a thickness of 17 μm.

<Preparation of Polarizing Plate 4>

A polarizing plate 4 was prepared according to the same production process as that for the above thinned polarizing plate, except the PVA layer of the laminate was formed to have a thickness of 10 μm.

Preparation of Pressure-Sensitive Adhesive Layer-Attached Polarizing Plate

Inventive Example 1

The pressure-sensitive adhesive A was applied to one surface of a 38 μm-thick polyethylene terephthalate (PET) film (MRF38 manufactured by Mitsubishi Polyester Film Co., Ltd.) subjected to a silicone treatment so as to allow a dried pressure-sensitive adhesive layer to have a thickness of 20 μm, and then dried at 155° C. for 1 minute. Then, the dried pressure-sensitive adhesive layer was transferred to the polarizing plate 1 to prepare a polarizing plate with a pressure-sensitive adhesive layer.

Inventive Example 2 to 10

Using various combinations of the pressure-sensitive adhesives and the polarizing plates, presented in Table 1, polarizing plate with a pressure-sensitive adhesive layers in Inventive Examples 2 to 10 were prepared in the same manner as that in Inventive Example 1.

Inventive Example 11

Using the pressure-sensitive adhesive D and the polarizing plate 4, a polarizing plate with a pressure-sensitive adhesive layer in Inventive Example 11 was prepared in the same manner as that in Inventive Example 1, except that the application was performed to allow the dried pressure-sensitive adhesive layer to have a thickness of 5 μm.

Comparative Example 1 to 4

A polarizing plate with a pressure-sensitive adhesive layer in comparative Example 1 was prepared in the same manner as that in Inventive Example 1, except that the pressure-sensitive adhesive E was used instead of the pressure-sensitive adhesive E.

Similarly, using various combinations of the pressure-sensitive adhesives and the polarizing plates, presented in Table 1, polarizing plate with a pressure-sensitive adhesive layers in Comparative Examples 2 to 4 were prepared.

<Measurement of Polarization Degree>

Regarding the polarizing plate with a pressure-sensitive adhesive layers (samples) obtained in Inventive Example 1 to 11 and Comparative Example 1 to 4 mentioned above were evaluated in the following manner. A result of the evaluation is presented in Table 1.

After each of the polarizing plate with a pressure-sensitive adhesive layers was subjected to a durability test (humidity resistance) in which it is left under heat and humidity conditions including a temperature of 60° C. and a humidity of 90%, for 300 hours, a width directional ventral region of the sample was cut into a piece having a size of 50 mm×25 mm to allow an absorption axis of the polarizing plate to define an angle of 45 degrees with respect to a long side of the cut sample, and a polarization degree (P) was measured using an integrating sphere type transmittance meter (DOT-3C manufactured by Murakami Color Research Laboratory). A result of the measurement is presented in Table 1 as an amount of change (Δ) before and after the durability test.

For example, a result of comparison between Inventive Examples 1 and 2 shows that an undesirable influence on the polarization degree of the polarizing plate can be more sufficiently suppressed along with a reduction in amount of the acid component in a total monomer component constituting the pressure-sensitive adhesive polymer.

Further, for example, a result of comparison between respective ones of Inventive Examples 7 to 10 shows that an excellent polarizing plate capable of suppressing deterioration in polarization degree can be obtained even using the aforementioned thinned polarizing film.

In order to obtain a good polarization degree (achieve ΔP<about 0.3) in the case of using the thinned polarizing film, it is understood that the amount of the acid component should be less than 8 wt %, preferably, equal to or less than 6 wt %.

Furthermore, from a result of comparison between Inventive Examples 10 and 11, it is inferred that, when a thickness of the pressure-sensitive adhesive layer is reduced while maintaining a thickness of the polarizing film constant, a total amount of acids against a polarizing film is reduced, and thereby the deterioration in polarization degree is suppressed.

<Evaluation on Reliability>

For the purpose of verifying that the polarizing plate with a pressure-sensitive adhesive layer of the present invention has excellent durability of pressure-sensitive adhesion, each of the polarizing plate with a pressure-sensitive adhesive layers (samples) obtained in Inventive Examples (Inventive Examples 1 to 7 and Inventive Examples 10 and 11) using a pressure-sensitive adhesive containing an acid component in a relatively small amount (pressure-sensitive adhesive A), and a pressure-sensitive adhesive containing an acid component in a relatively large amount (pressure-sensitive adhesive D) was evaluated in the following manner. A result of the evaluation is presented in Table 2.

The sample was cut into a piece having a size of 420 mm length×320 mm width, and the cut sample was attached to each of opposite surfaces of a 0.7 mm-thick alkali-free glass plate by using a laminator. Then, the cut sample was subjected to an autoclave treatment at 50° C. and 5 atm for

TABLE 1

|  | Pressure-Sensitive Adhesive | Acid Component (wt %) | Thickness of Pressure-Sensitive Adhesive (μm) | Polarizing Plate | Thickness of Polarizing Film (μm) | ΔP |
|---|---|---|---|---|---|---|
| Inventive Example 1 | A | 0 | 20 | 1 | 25 | 0.002 |
| Inventive Example 2 | D | 6 | 20 | 1 | 25 | 0.038 |
| Inventive Example 3 | A | 0 | 20 | 2 | 10 | 0.018 |
| Inventive Example 4 | D | 6 | 20 | 2 | 10 | 0.120 |
| Inventive Example 5 | A | 0 | 20 | 3 | 7 | 0.030 |
| Inventive Example 6 | D | 6 | 20 | 3 | 7 | 0.168 |
| Inventive Example 7 | A | 0 | 20 | 4 | 4 | 0.058 |
| Inventive Example 8 | B | 2 | 20 | 4 | 4 | 0.116 |
| Inventive Example 9 | C | 4 | 20 | 4 | 4 | 0.155 |
| Inventive Example 10 | D | 6 | 20 | 4 | 4 | 0.215 |
| Inventive Example 11 | D | 6 | 5 | 4 | 4 | 0.167 |
| Comparative Example 1 | E | 10 | 20 | 1 | 25 | 0.110 |
| Comparative Example 2 | E | 10 | 20 | 2 | 10 | 0.198 |
| Comparative Example 3 | E | 10 | 20 | 3 | 7 | 0.230 |
| Comparative Example 4 | E | 10 | 20 | 4 | 4 | 0.346 |

15 minutes, so that it was closely attached to the alkali-free glass plate without any gap. The treated sample was subjected to a treatment at 80° C. for 500 hours (heating test), or subjected to a treatment at 60° C. and 90% RH for 500 hours (humidity test). After the test, states of foaming, peeling and lifting were visually evaluated by the following criteria.

"***": There is no change in appearance, such as foaming, peeling and lifting.

"**": There is no practical problem, although slight peeling at an edge and foaming are observed.

"*": There is no practical problem except in case of a special purpose, although slight peeling at an edge and foaming are observed.

"No *" (blank): There is a practical problem due to significant peeling at an edge and foaming.

tive adhesive layer, each of the polarizing plate with a pressure-sensitive adhesive layers (samples) obtained in Inventive Examples 1 to 6 and Comparative Examples 1 to 3 was evaluated in the following manner. A result of the evaluation is presented in Table 3.

The sample was cut into a piece having a size of 420 mm length×320 mm width, and the cut sample was laminated to a 0.7 mm-thick alkali-free glass plate by using a laminator. Then, the cut sample was subjected to an autoclave treatment at 50° C. and 5 atm for 15 minutes, so that it was closely attached to the alkali-free glass plate without any gap. Subsequently, the sample was manually peeled off from the alkali-free glass plate, and evaluated by the following criteria.

TABLE 2

|  | Pressure-Sensitive Adhesive | Acid Component (wt %) | Thickness of Pressure-Sensitive Adhesive (μm) | Polarizing Plate | Thickness of Polarizing Film (μm) | Durability Before.. Heating | After Heating |
|---|---|---|---|---|---|---|---|
| Inventive Example 1 | A | 0 | 20 | 1 | 25 | * | * |
| Inventive Example 2 | D | 6 | 20 | 1 | 25 | ** | ** |
| Inventive Example 3 | A | 0 | 20 | 2 | 10 | ** | ** |
| Inventive Example 4 | D | 6 | 20 | 2 | 10 | *** | *** |
| Inventive Example 5 | A | 0 | 20 | 3 | 7 | *** | *** |
| Inventive Example 6 | D | 6 | 20 | 3 | 7 | *** | *** |
| Inventive Example 7 | A | 0 | 20 | 4 | 4 | *** | *** |
| Inventive Example 10 | D | 6 | 20 | 4 | 4 | *** | *** |
| Inventive Example 11 | D | 6 | 5 | 4 | 4 | ** | ** |

From the result, it has been verified that the polarizing plate with a pressure-sensitive adhesive layers in Inventive Examples do not include any defective sample having a practical problem in terms of durability (evaluated as "No *").

Further, it is understood that the polarizing plate with a pressure-sensitive adhesive layer obtained using the thinned polarizing film is significantly excellent in not only optical properties such as polarization degree but also durability.

<Evaluation on Reworkability>

For the purpose of evaluating an influence of an amount of an acid component in a total monomer component constituting the pressure-sensitive adhesive polymer, on reworkability of the polarizing plate with a pressure-sensitive adhesive layer, each of the polarizing plate with a Double ○: The sample could be adequately peeled without any break.

○: The sample could be adequately peeled although slight break occurred therein.

Δ: Although the sample was slightly broken, it could be peeled through retry.

x: The sample was broken, and could not be peeled even by retry.

TABLE 3

|  | Pressure-Sensitive Adhesive | Acid Component (wt %) | Thickness of Pressure-Sensitive Adhesive (μm) | Polarizing Plate | Thickness of Polarizing Film (μm) | Reworkability |
|---|---|---|---|---|---|---|
| Inventive Example 1 | A | 0 | 20 | 1 | 25 | Double ○ |
| Inventive Example 2 | D | 6 | 20 | 1 | 25 | ○ |
| Inventive Example 3 | A | 0 | 20 | 2 | 10 | Double ○ |
| Inventive Example 4 | D | 6 | 20 | 2 | 10 | ○ |
| Inventive Example 5 | A | 0 | 20 | 3 | 7 | Double ○ |
| Inventive Example 6 | D | 6 | 20 | 3 | 7 | Δ |
| Comparative Example 1 | E | 10 | 20 | 1 | 25 | X |
| Comparative Example 2 | E | 10 | 20 | 2 | 10 | X |
| Comparative Example 3 | E | 10 | 20 | 3 | 7 | X |

From the result, it is understood that an undesirable influence of the amount of acid component in the total monomer component constituting the pressure-sensitive adhesive polymer, on the reworkability, becomes prominent as the polarizing plate has a smaller thickness. It is also understood that, when the amount of acid component reaches 10 wt %, the reworkability is significantly deteriorated, irrespective of the thickness of the polarizing plate.

INDUSTRIAL APPLICABILITY

The present invention can provide a polarizing plate with a pressure-sensitive adhesive layer which is excellent in reliability of optical properties, durability of pressure-sensitive adhesion, and reworkability. The polarizing plate with a pressure-sensitive adhesive layer of the present invention is capable of suppressing deterioration in reliability of optical properties such as polarization degree, which would otherwise be caused degradation of a polarizing film. Thus, when a device is formed using the polarizing plate with a pressure-sensitive adhesive layer of the present invention, it becomes possible to prevent the occurrence of display defect such as deterioration in contrast, in case of a liquid crystal display device, and the occurrence of defects such as defect in hue and deterioration in anti-reflection function, in the case of an OLED.

What is claimed is:

1. A polarizing plate with a pressure-sensitive adhesive layer comprising a polarizing film and a pressure-sensitive adhesive layer provided directly on at least one surface of the polarizing film, wherein the pressure-sensitive adhesive layer comprises a pressure-sensitive adhesive composition containing a pressure-sensitive adhesive polymer, and wherein an amount of an acid component in a total monomer component constituting the pressure-sensitive adhesive polymer is less than 2 wt %.

2. The polarizing plate with a pressure-sensitive adhesive layer as defined in claim 1, wherein the polarizing film has a thickness of 10 µm or less.

3. The polarizing plate with a pressure-sensitive adhesive layer as defined in claim 2, wherein the thickness of the polarizing film is equal to or less than 7 µm.

4. The polarizing plate with a pressure-sensitive adhesive layer as defined in claim 1, wherein the amount of the acid component is less than 0.05 wt %.

5. The polarizing plate with a pressure-sensitive adhesive layer as defined in claim 1, wherein the pressure-sensitive adhesive polymer does not substantially contain an acid component.

6. The polarizing plate with a pressure-sensitive adhesive layer as defined in claim 1, wherein the pressure-sensitive adhesive layer is provided on only one surface of the polarizing film.

7. The polarizing plate with a pressure-sensitive adhesive layer as defined in claim 1, wherein the pressure-sensitive adhesive layer has a thickness of 1 to 35 µm.

8. The polarizing plate with a pressure-sensitive adhesive layer as defined in claim 1, wherein the pressure-sensitive adhesive polymer is an acryl-based polymer or a methacryl-based polymer.

9. An image display device using the polarizing plate with a pressure-sensitive adhesive layer as defined in claim 1, in a number of at least one.

10. The polarizing plate with a pressure-sensitive adhesive layer as defined in claim 1, wherein the acid component comprises a carboxyl group, a phosphate group or a sulfonate group.

11. The polarizing plate with a pressure-sensitive adhesive layer as defined in claim 1, wherein the pressure-sensitive adhesive layer further comprises a crosslinking agent.

12. The polarizing plate with a pressure-sensitive adhesive layer as defined in claim 1, wherein the pressure-sensitive adhesive layer further comprises a silane coupling agent.

* * * * *